(12) United States Patent
Armstrong et al.

(10) Patent No.: US 9,004,057 B2
(45) Date of Patent: Apr. 14, 2015

(54) APPLIANCE BAFFLE SYSTEM

(75) Inventors: James Lee Armstrong, Louisville, KY (US); Paul Bryan Cadima, Prospect, KY (US)

(73) Assignee: General Electric Company, Schenectady, NY (US)

(*) Notice: Subject to any disclaimer, the term of this patent is extended or adjusted under 35 U.S.C. 154(b) by 608 days.

(21) Appl. No.: 13/347,250

(22) Filed: Jan. 10, 2012

(65) Prior Publication Data

US 2013/0174832 A1    Jul. 11, 2013

(51) Int. Cl.
*A21B 1/00* (2006.01)
*F24C 15/32* (2006.01)
*A47J 37/07* (2006.01)

(52) U.S. Cl.
CPC ............ *F24C 15/322* (2013.01); *A47J 37/0754* (2013.01)

(58) Field of Classification Search
CPC .... F24C 15/322; F24C 15/2007; F24C 3/087; F24C 15/00; F24C 7/085; F24C 7/04; F24C 7/06; F24C 7/065; A21B 1/245; A21B 1/26; A21B 1/24; A21B 3/00; A47J 37/0641; A47J 39/003; A47J 37/0754
USPC .......... 126/21 R, 21 A, 22, 99 D, 15 R, 15 A; 219/401, 400
See application file for complete search history.

(56) References Cited

U.S. PATENT DOCUMENTS 5,038,748 A * 8/1991 Lockwood et al. ......... 126/19 R
6,125,838 A * 10/2000 Hedgpeth ................... 126/41 R
6,895,953 B2   5/2005 Larsen et al.

* cited by examiner

*Primary Examiner* — Alfred Basichas
(74) *Attorney, Agent, or Firm* — GE Global Patent Operation; Douglas D. Zhang

(57) ABSTRACT

An appliance comprises at least one heating component, a baffle component positioned below the at least one heating component, an air intake component positioned above at least a portion of the baffle component, and an air redirection component positioned between the air intake component and the baffle component. In an example of an airflow path in the appliance, air entering the appliance through the air intake component is directed down below the baffle component by the air redirection component before flowing up through the baffle component to the at least one heating component.

18 Claims, 6 Drawing Sheets

VIEW A-A

APPLIANCE BAFFLE SYSTEM

BACKGROUND OF THE INVENTION

The subject matter disclosed herein relates to appliances such as ovens, and more particularly to improved baffle systems for use in appliances such as ovens.

A baffle system is typically used in an appliance, such as an oven, to direct airflow to the burners for combustion in order to generate the heat to operate the oven. The baffle system also provides for cooling the bottom of the appliance.

In traditional single oven appliances (i.e., an appliance with only one oven compartment), there is typically an open area below the oven compartment that accommodates a slide-out drawer. In between the oven compartment and the drawer area is the baffle system. Typically, the baffle system is comprised of metal sheets stacked together with holes in each sheet that are offset between adjacent layers. This allows for radiated heat from the oven compartment to be reflected back up toward the oven compartment while allowing air to flow up from the drawer area through the holes in the baffle system to the burners. Thus, in such a design, the air needed by the burners enters the oven appliance via the drawer area, which is below the baffle system, and is drawn from the open space of the drawer area through the baffle system to the burners. The air flowing through the baffle system also provides a cooling effect. This cooling effect keeps the drawer area, and thus the floor of the appliance, at a suitable temperature while the oven is in operation.

However, in a dual oven appliance design, a second oven compartment is added to the appliance such that one oven compartment is positioned below the other oven compartment. In such a design, due to space restrictions, the second oven compartment eliminates the ability to have an open space drawer area at the bottom of the appliance. Thus, typical airflow via the above-mentioned path (entering drawer area, upward through baffle system, and to the burners) is problematic.

BRIEF DESCRIPTION OF THE INVENTION

As described herein, the exemplary embodiments of the present invention overcome one or more disadvantages known in the art.

One aspect of the present invention relates to an appliance comprising at least one heating component, a baffle component positioned below the at least one heating component, an air intake component positioned above at least a portion of the baffle component, and an air redirection component positioned between the air intake component and the baffle component. In an example of an airflow path in the appliance, air entering the appliance through the air intake component is directed down below the baffle component by the air redirection component and up through the baffle component to the at least one heating component.

Another aspect of the present invention relates to a baffle system comprising a baffle component positioned below at least one heating component of an appliance in which the baffle system is deployed, an air intake component positioned above at least a portion of the baffle component, and an air redirection component positioned between the air intake component and the baffle component.

Advantageously, illustrative embodiments of the present invention provide sufficient airflow to the burners of an oven as well as cooling at the floor of the appliance in a configuration that has space restrictions, such as a dual oven appliance configuration.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

DETAILED DESCRIPTION OF THE EXEMPLARY EMBODIMENTS OF THE INVENTION

One or more illustrative embodiments of the invention will be described below in the context of a dual oven appliance. However, it is to be understood that embodiments of the invention are not intended to be limited to use with any particular appliances. Rather, embodiments of the invention may be applied to and deployed in any other suitable environment in which it would be desirable to have an improved baffle system. Also, for example, this may include a single oven appliance configuration with a large capacity oven cavity that has space restrictions at the bottom of the appliance, similar to the above-mentioned space restrictions associated with a dual oven appliance configuration.

As illustratively used herein, the term "appliance" is intended to refer to a device or equipment designed to perform one or more specific functions. This may include, but is not limited to, equipment for consumer use, e.g., ovens. This may also include, but is not limited to, any equipment that is useable in household or commercial environments.

Illustrative embodiments of the invention provide apparatus, systems and methods that provide an improved baffle design that permits large cavity volume when deployed in an oven appliance. The improved design improves airflow delivery into the baffle system and uses this airflow to cool the bottom of the appliance before the air enters the oven to aid combustion.

Accordingly, as will be illustrated in one or more illustrative embodiments, the improved baffle system includes one or more baffle components positioned below the burner (heating component) of the oven. The improved baffle system also includes one or more air intake components positioned above at least a portion of the one or more baffle components. Further, the improved baffle system includes an air redirection component positioned between the one or more air intake components and the one or more baffle components. In this configuration, air entering the oven appliance through the one or more air intake components is directed down below the one or more baffle components by the air redirection component and then up through the one or more baffle components to burner of the oven. Through this improved baffle design, sufficient airflow for cooling and combustion is realized despite the space restrictions imposed by the oven configuration.

While the improved baffle system can be implemented in single oven appliance configurations, as well as other suitable appliances, the figures below illustratively describe the improved baffle system in the context of a dual oven appliance configuration.

Figure 1:
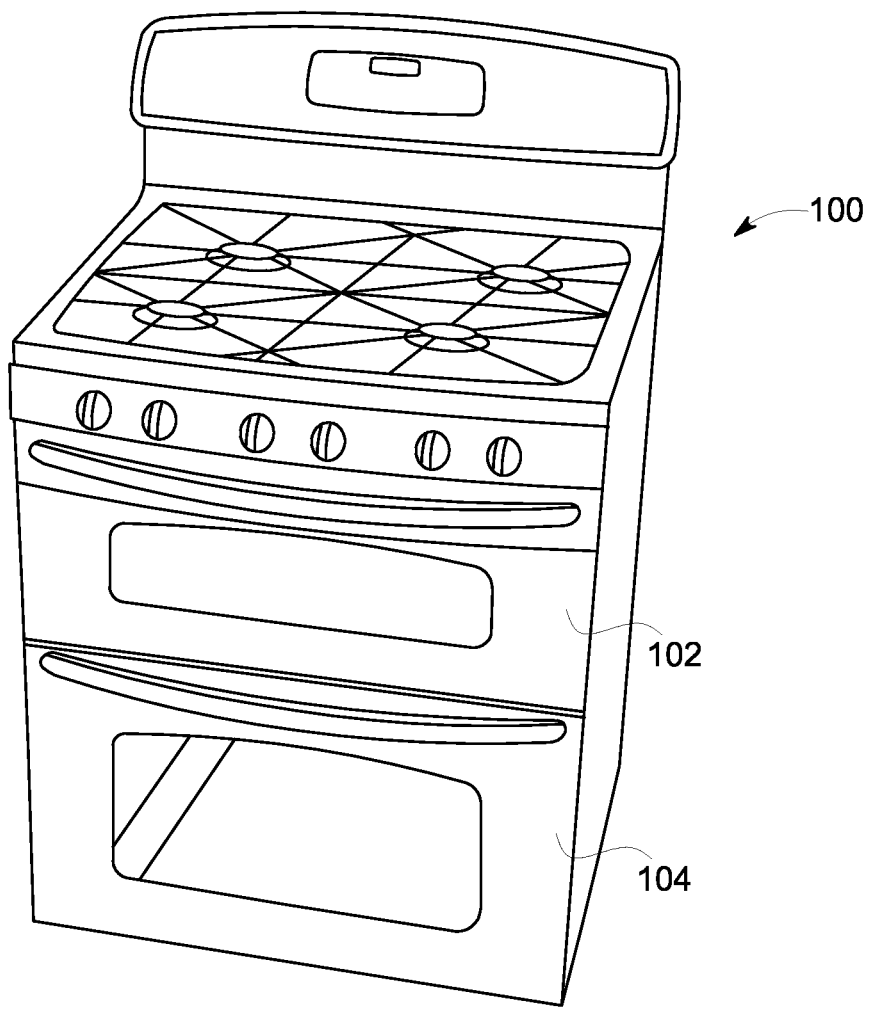
FIG. 1 is a diagram of a dual oven appliance, according to an embodiment of the invention.

FIG. 1 is a diagram of a dual oven appliance 100, according to an embodiment of the invention. More specifically, as shown, the dual oven appliance 100 includes an upper oven 102 and a lower oven 104. The appliance 100 may also be referred to as a freestanding gas range having dual ovens. As mentioned above, because of the addition of a second (lower) oven, there is no room for a slide-out drawer beneath the lower oven. Thus, there is no ability to utilize the open space of such a drawer from which to draw air for cooling and combustion.

Accordingly, the dual oven appliance 100 includes an improved baffle system that provides sufficient airflow for cooling and combustion without compromising the capacities for the upper oven 102 and the lower oven 104. By way of example only, the upper oven compartment (or cavity) in appliance 100 may be about 2.4 cubic feet in capacity while the lower oven compartment (or cavity) may be about 4.3 cubic feet in capacity. Note that these are only example capacities for a freestanding gas range appliance, and thus other capacity ovens (larger and smaller) could be used in accordance with the improved baffle system described herein.

Figure 2:
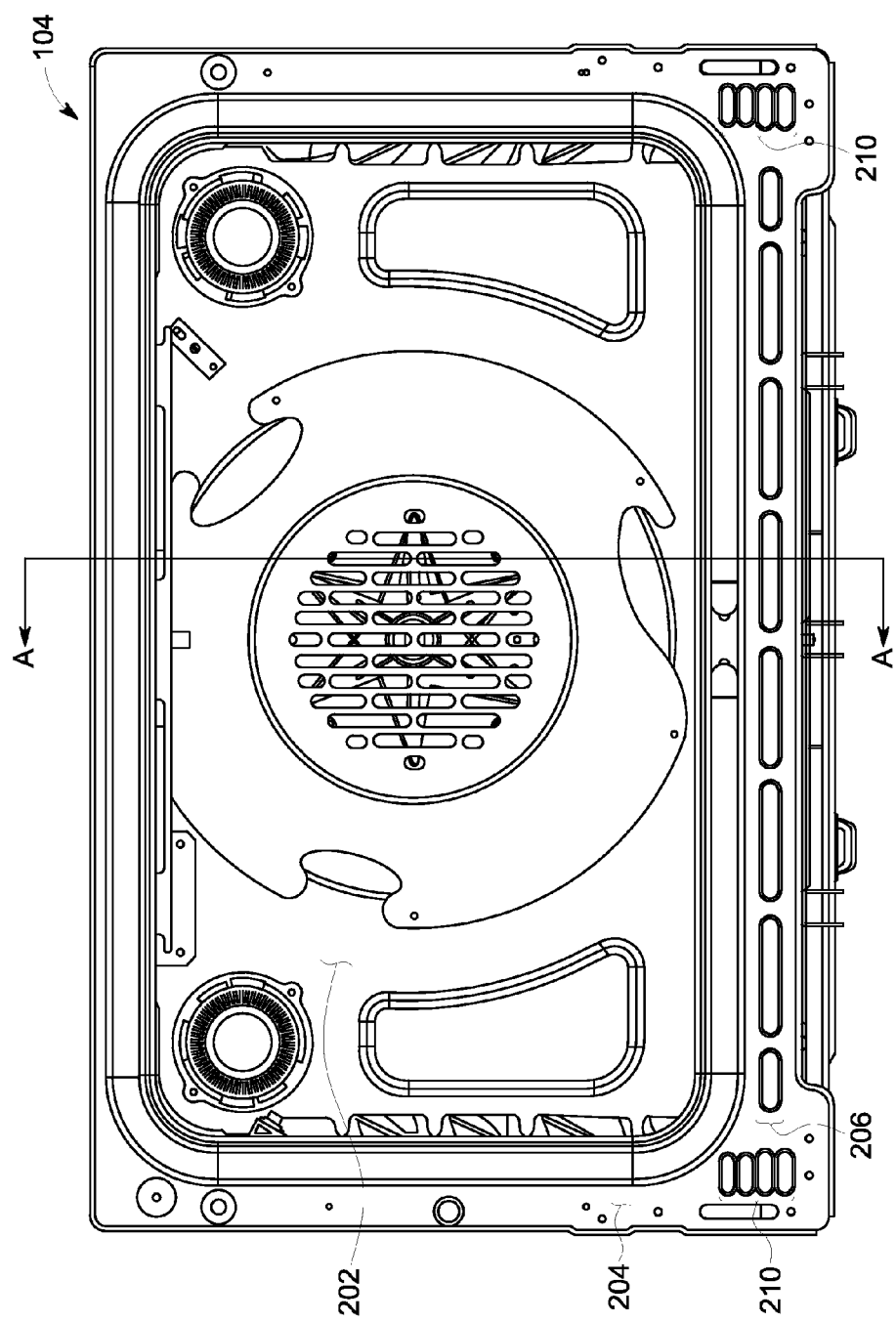
FIG. 2 is a diagram of a front view of a lower oven compartment of the dual oven appliance of FIG. 1 with the door removed.

FIG. 2 is a diagram of a front view of the lower oven 104 of the dual oven appliance 100 with the front door removed. As shown, the lower oven 104 has an inner cavity or compartment 202. Around the outer opening of the compartment 202 is a front frame 204. In the front frame 204 are formed one or more air intake components 206. In this example, the air intake components 206 are shown as a plurality of horizontally-aligned, slot-shaped openings formed through the front frame 204 of the lower oven 104. The number and shape of the air intake components may vary depending on the oven design and shape. Thus, alternatively, there may be one long air intake component, or multiple ones with different shapes and/or positions on the front frame. Note that the one or more air intake components 206 are positioned above at least a portion of one or more baffle components (which will be described below in the context of FIGS. 4 and 5).

Also, it is to be understood that while air intake components 206 are used to take in air for the lower oven 104, there is another set of air intake components 210 shown in FIG. 2. Air intake components 210 are formed in each side of the lower part of the front frame 204 and are used to take in air for the upper oven 102. The airflow that enters air intake components 210 goes up the sides of the lower oven 104 and into the baffle components (not shown) below the upper oven 102.

Figure 3:
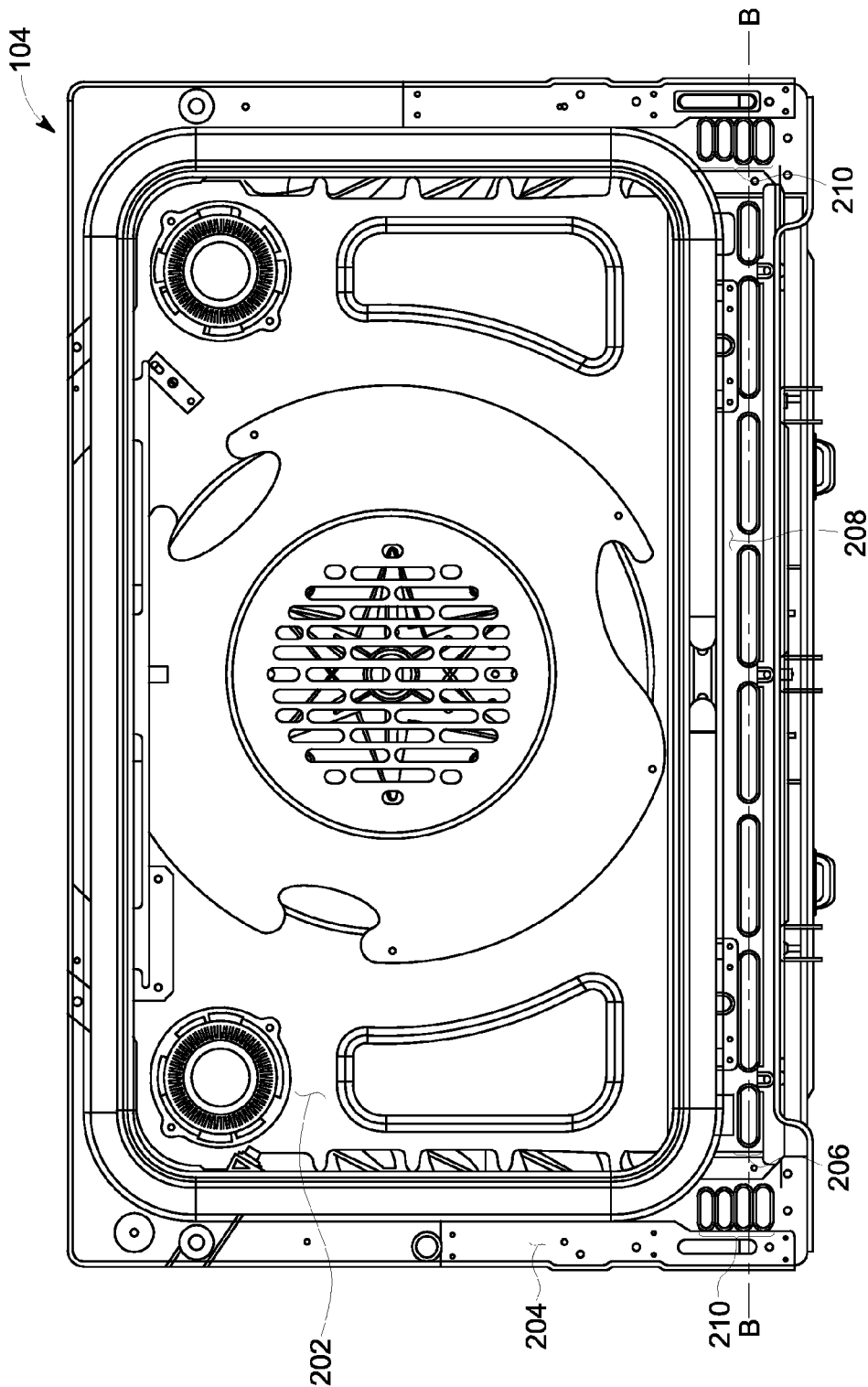
FIG. 3 is a diagram of the front view of the lower oven compartment of FIG. 2 with the front frame transparent.
Figure 4:
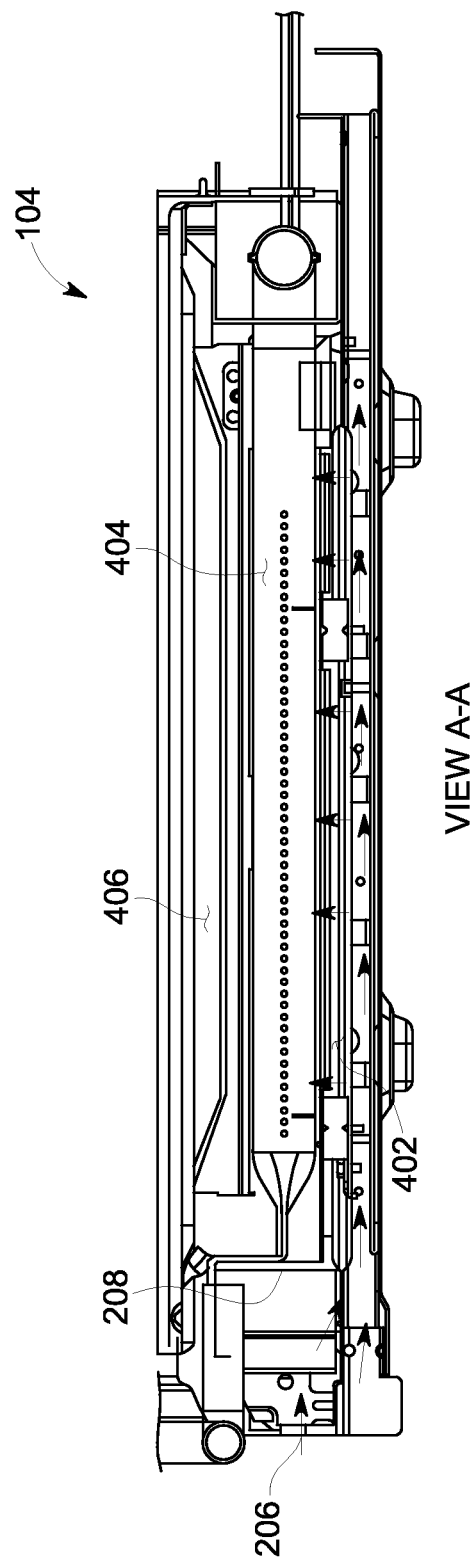
FIG. 4 is a diagram of a side view A-A cut substantially through the center of the lower oven of FIG. 2.
Figure 5:
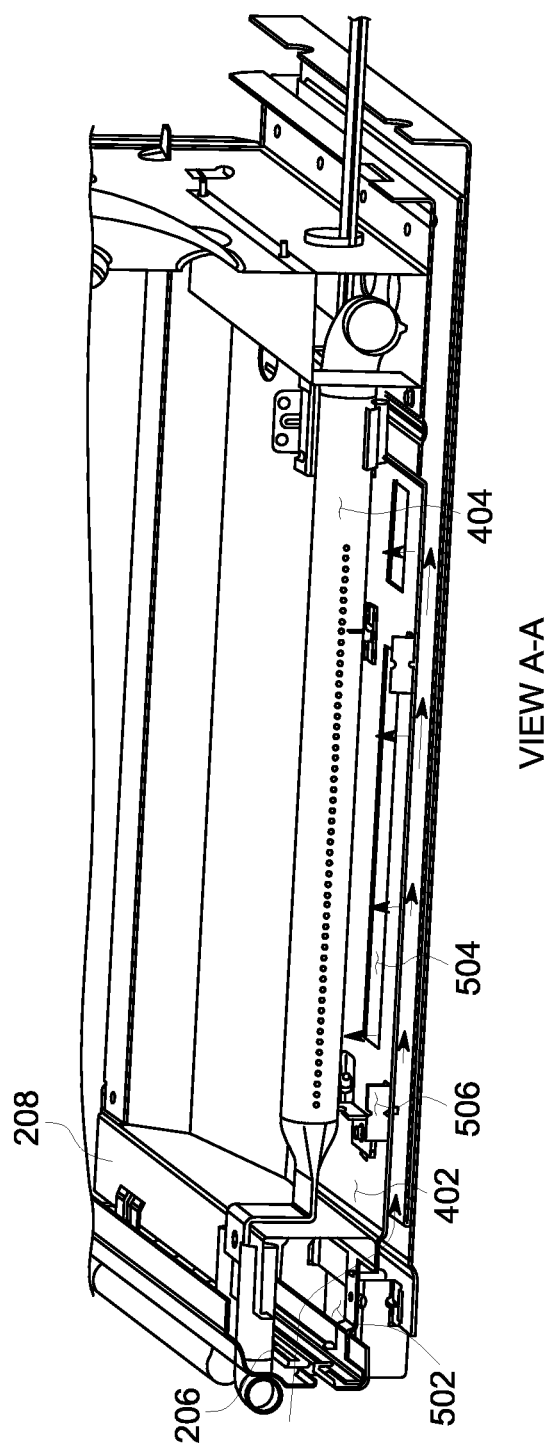
FIG. 5 is a diagram of a side view A-A cut substantially through the center of the lower oven of FIG. 2 with the lower oven compartment removed.

FIG. 3 is a diagram of the front view of the lower oven 104 of FIG. 2 with the front frame transparent. That is, the front frame 204 is shown in a transparent manner so that an air redirection component 208 can be more readily seen. As shown, in this illustrative embodiment, the air redirection component 208 runs parallel to the centerline B-B of the air intake components 206. As is best seen in FIGS. 4 and 5, by the configuration of air redirection component 208, the air drawn in through the air intake components 206 is blocked by the air redirection component 208 and redirected down below the one or more baffle components. It is realized that, without the air redirection component 208, the air drawn into the front of the appliance would be drawn directly to the burner (shown in FIGS. 4 and 5) of the lower oven 104, and thus not be directed through the baffle components. Therefore, there would be no appreciable cooling at the floor of the appliance.

It is also to be appreciated that a gap exists between the door of the lower oven 104 and the front frame 204 that allows air to enter air intake components 206 for the lower oven 104 as well as air intake components 210 for the upper oven 102.

Note that while the air redirection component 208, in this embodiment, is a vertically-oriented strip set back from, and running the length of, the air intake components 206, it is to be understood that the air redirection component may be positioned in different orientations, and formed in different shapes and/or sizes. Also, the air redirection component 208 may be formed as more than one component. By way of example only, the air redirection component 208 may be formed from metal, or some other suitable material(s) that can withstand the temperatures in the area where the component is mounted.

FIG. 4 shows a side view cut through the center of the dual oven appliance 100, while FIG. 5 shows a similar side view cut through the center of the dual oven appliance 100 with the lower oven compartment removed. Thus, as shown, the one or more baffle components are depicted as 402. In this embodiment, the baffle components are comprised of metal sheets stacked together with opening 504 in each sheet that are offset between adjacent sheets. FIG. 5 shows just one sheet for ease of illustration. While one sheet (or layer or component) may be used in an embodiment, it may be preferred that multiple sheets (or layers or components) are employed to provide sufficient heat reflection as well as airflow to the burner 404. Note that the lower oven compartment (cavity) is depicted as 406, which is removed in the view in FIG. 5 so that the air redirection component 208, baffle component(s) 402, and burner 404 are more readily visible.

Thus, in accordance with the embodiments of the improved baffle system illustrated in the figures, the path of air from outside the appliance to the burner is as follows (the arrows in FIGS. 4 and 5 depict the path of the airflow). Air is drawn by convection into the dual oven appliance 100 through the air intake components 206. The air is blocked by the air redirection component 208 preventing it from going directly to the burner 404, which is shown in-line with the air intake components 206 (but which may alternatively be above or below the air intake components). The air redirection component 208 directs the air down and through openings 502 (FIG. 5) in the frame of the appliance. The air flows below the baffle components 402. Then, the air rises up through the openings 504 in the baffle components 402 to the burner 404 of the lower oven 104. It is to be understood that through natural convection, upward air movement is a result of the buoyancy when air changes density as it is heated by the oven. When the hot air exits the oven, it causes cool air to enter the appliance. Through this improved baffle design, sufficient airflow for cooling and combustion is realized despite the space restrictions imposed by the dual oven configuration.

Note also that the baffle components 402, in the embodiment shown in FIGS. 4 and 5), have one or more metal tabs 506 bent up to serve as spacers to ensure space between the baffle components and adjacent surfaces.

Figure 6:
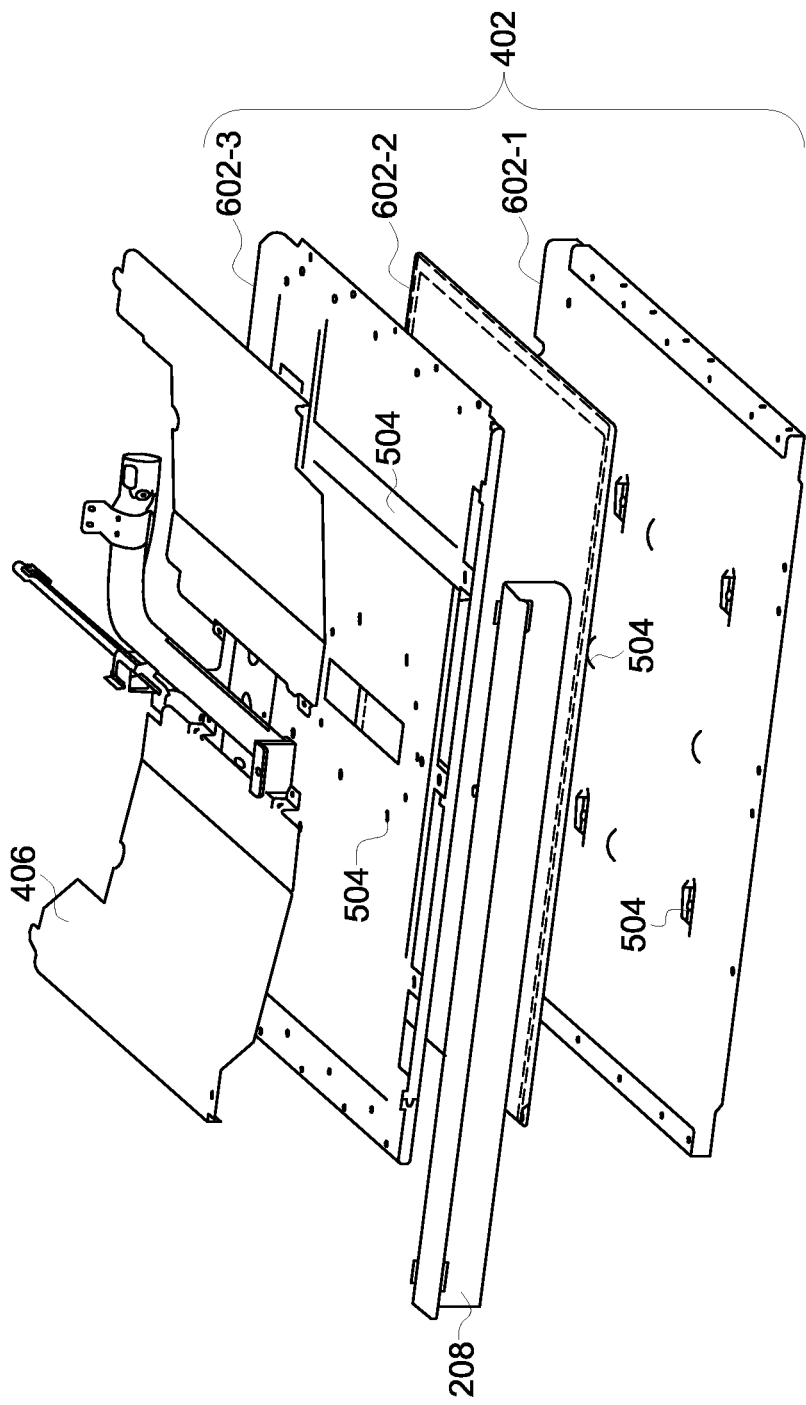
FIG. 6 is a diagram of an exploded view of baffle components, according to an embodiment of the invention.

FIG. 6 shows baffle components 402, according to an embodiment of the invention. More particularly, the figure is an exploded view of a plurality of metal sheets (layers) 602-1, 602-2 and 602-3, each having openings 504 that are offset between adjacent sheets, as mentioned above. It is to be understood that the baffles shown in FIG. 6 are intended to be one example and, thus, other configurations can be employed. Also shown in the exploded view are the air redirection component 208 and the bottom of the oven compartment 406.

Advantageously, as described herein, one or more embodiments of the invention provide for at least one inlet into the appliance that allows air into the baffle system feeding primary and secondary air to the burner which inlet is above or in-line with the burner.

Still further, as described herein, one or more embodiments of the invention provide for at least one air inlet into the appliance that feeds air into the baffle system which inlet is above the top baffle feeding air to the burner.

Thus, while there have been shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An appliance comprising:
   at least one oven comprising an oven compartment;
   a front frame surrounding an outer opening of the oven compartment;
   at least one heating component;
   a baffle component positioned below the at least one heating component and comprising a plurality of vertically spaced apart stacked layers, each layer of the plurality of stacked layers comprising one or more openings;
   an air intake component comprising one or more openings formed through the front frame and positioned above at least a portion of the baffle component; and
   an air redirection component positioned between the air intake component and the baffle component;
   wherein the one or more openings of the air intake component are distinct from the one or more openings of the plurality of stacked layers of the baffle component; and
   wherein air entering the appliance through the air intake component is directed down below the baffle component by the air redirection component to cool a floor of the appliance before flowing up through the baffle component to the at least one heating component.

2. The appliance of claim 1, wherein the at least one heating component provides heat to the oven compartment.

3. The appliance of claim 2, further comprising a second heating component positioned above the baffle component, the second heating component providing heat to a second oven compartment.

4. The appliance of claim 1, wherein the air intake component is positioned in-line with the at least one heating element.

5. The appliance of claim 1, wherein the air intake component is positioned above the at least one heating element.

6. The appliance of claim 1, wherein the air intake component comprises a plurality of horizontally-aligned, slot-shaped openings formed through the front frame of a lower portion of the appliance.

7. The appliance of claim 1, wherein the one or more openings on a given one of the plurality of stacked layers are offset from the one or more openings on an adjacent one of the plurality of stacked layers.

8. The appliance of claim 1, wherein the air redirection component is set back from, and runs the length of, the air intake component.

9. The appliance of claim 1 wherein the air redirection component is configured to direct air entering the appliance down below all of the plurality of stacked layers of the baffle component to cool the floor of the appliance before the air entering the appliance flows up through any of the plurality of stacked layers of the baffle component.

10. A baffle system comprising:
    a baffle component positioned below at least one heating component of an oven appliance in which the baffle system is deployed, the baffle component comprising a plurality of vertically spaced apart stacked layers, each layer of the plurality of stacked layers comprising one or more openings;
    an air intake component comprising one or more openings formed through a front frame surrounding an outer opening of an oven compartment of at least one oven of the oven appliance, the air intake component being positioned above at least a portion of the baffle component; and
    an air redirection component positioned between the air intake component and the baffle component;
    wherein the one or more openings of the air intake component are distinct from the one or more openings of the plurality of stacked layers of the baffle component; and
    wherein air entering the oven appliance through the air intake component is directed down below the baffle component by the air redirection component to cool a floor of the oven appliance before flowing up through the baffle component to the at least one heating component of the oven appliance.

11. The baffle system of claim 10, wherein the air intake component is positioned in-line with the at least one heating element.

12. The baffle system of claim 10, wherein the air intake component is positioned above the at least one heating element.

13. The baffle system of claim 10, wherein the air intake component comprises a plurality of horizontally-aligned, slot-shaped openings formed through the front frame of a lower portion of the oven appliance.

14. The baffle system of claim 10, wherein the one or more openings on a given one of the plurality of stacked layers are offset from the one or more openings on an adjacent one of the plurality of stacked layers.

15. The baffle system of claim 10, wherein the air redirection component is set back from, and runs the length of, the air intake component.

16. The baffle system of claim 10 wherein the air redirection component is configured to direct air entering the oven appliance down below all of the plurality of stacked layers of the baffle component to cool the floor of the oven appliance before the air entering the oven appliance flows up through any of the plurality of stacked layers of the baffle component.

17. A dual oven appliance comprising:
    an upper oven comprising an upper oven compartment;
    a lower oven comprising a lower oven compartment;

a front frame surrounding an outer opening of the lower oven compartment;

a baffle component positioned below a burner of the lower oven and comprising a plurality of vertically spaced apart stacked layers, each layer of the plurality of stacked layers comprising one or more openings;

an air intake component comprising one or more openings formed through the front frame and positioned above at least a portion of the baffle component; and an air redirection component positioned between the air intake component and the baffle component;

wherein the one or more openings of the air intake component are distinct from the one or more openings of the plurality of stacked layers of the baffle component; and wherein air entering the dual oven appliance through the air intake component is directed down below the baffle component by the air redirection component to cool a floor of the dual oven appliance before flowing up through the baffle component to the burner of the lower oven.

18. The dual oven appliance of claim 17 wherein the air redirection component is configured to direct air entering the dual oven appliance down below all of the plurality of stacked layers of the baffle component to cool the floor of the dual oven appliance before the air entering the dual oven appliance flows up through any of the plurality of stacked layers of the baffle component.

* * * * *